(12) United States Patent
Finkler et al.

(10) Patent No.: US 8,438,341 B2
(45) Date of Patent: May 7, 2013

(54) COMMON MEMORY PROGRAMMING

(75) Inventors: Ulrich A. Finkler, Mahopac, NY (US);
Steven N. Hirsch, Burlington, VT (US);
Harold E. Reindel, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/816,588

(22) Filed: Jun. 16, 2010

(65) Prior Publication Data

US 2011/0314238 A1 Dec. 22, 2011

(51) Int. Cl.
*G06F 12/00* (2006.01)

(52) U.S. Cl.
USPC ............................ 711/152; 711/203; 719/312

(58) Field of Classification Search .................. 711/152, 711/203; 719/312
See application file for complete search history.

(56) References Cited

U.S. PATENT DOCUMENTS

| | | | |
|---|---|---|---|
| 6,029,205 A | 2/2000 | Alferness et al. | |
| 6,163,801 A | 12/2000 | O'Donnell et al. | |
| 6,205,528 B1 | 3/2001 | Kingsbury et al. | |
| 6,539,435 B2 | 3/2003 | Bolmarcich et al. | |
| 6,681,239 B1 | 1/2004 | Munroe et al. | |
| 7,124,211 B2 | 10/2006 | Dickson et al. | |
| 7,451,278 B2 | 11/2008 | Feind et al. | |
| 8,117,418 B1 * | 2/2012 | Metcalf et al. | ................ 711/203 |
| 2002/0029239 A1 | 3/2002 | Sullivan et al. | |
| 2003/0056020 A1 * | 3/2003 | Chaudhry et al. | ............ 709/313 |
| 2007/0067771 A1 | 3/2007 | Kulbak et al. | |
| 2008/0155197 A1 | 6/2008 | Li et al. | |

OTHER PUBLICATIONS

Andrew S. Tanenbaum, Modern Operating Systems, 2001, Prentice-Hall, Inc., second edition, pp. 40, 41, and 240-242.*
Clapp, Russel M. et al., "Cache Coherence Requirements for Interprocess Rendezvous", International Journal of Parallel Programming, vol. 19., No. 1, Jul. 1990, pp. 31-51.

* cited by examiner

*Primary Examiner* — Jared Rutz
(74) *Attorney, Agent, or Firm* — Tutunjian & Bitetto, P.C.; Preston Young (57) ABSTRACT

A method for unidirectional communication between tasks includes providing a first task having access to an amount of virtual memory, blocking a communication channel portion of said first task's virtual memory, such that the first task cannot access said portion, providing a second task, having access to an amount of virtual memory equivalent to the first task's virtual memory, wherein a communication channel portion of the second task's virtual memory corresponding to the blocked portion of the first task's virtual memory is marked as writable, transferring the communication channel memory of the second task to the first task, and unblocking the communication channel memory of the first task.

20 Claims, 5 Drawing Sheets

COMMON MEMORY PROGRAMMING

BACKGROUND

1. Technical Field

The present invention relates to parallel programming techniques and, in particular, to systems and methods which employ a parallel programming model that does not require coherence.

2. Description of the Related Art

Modern computer systems require fast caches to enable processors to exploit their computational capabilities without being hampered excessively by the comparatively slow access to main memory. Thus multiple pieces of physical memory (e.g., in caches of several cores and one main memory location) may be simultaneously associated with a single location X in virtual memory. This creates multiple physical views of one location in the shared virtual address space.

Due to the existence of multiple physical views of one virtual address space, location mechanisms are required to ensure that these different views result in the same outcome when determining the memory's content. In hardware that supports multi-threading with mutices, this is achieved via cache-coherence by disallowing correct programs from 'seeing' differing views.

SUMMARY

A method for unidirectional communication between tasks is shown, including blocking a communication channel portion of a first virtual memory of a first task, such that the first task cannot access said portion; providing a second task, having access to a second amount of virtual memory with the same virtual address as the first virtual memory of the first task and having associated virtual table entries, wherein a communication channel portion of the second virtual memory corresponding to the blocked portion of the first virtual memory is usable; mapping virtual table entries in the communication channel to physical memory; transferring virtual table entries of the communication channel memory of the second task to the first task; and unblocking the communication channel memory of the first task.

Furthermore, a system for parallel processing is shown that includes physical memory; a plurality of processes that are executed by one or more processors, including a first process and a second process, each process having a virtual memory that maps to the physical memory; and a communication channel that establishes a temporary, unidirectional pathway for the transfer of pointer-based structures between the respective virtual memories of the first and second processes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles relate to a model for parallel programming that permits unidirectional communication between tasks that does not require cache coherence and is resistant to race condition errors. A communication channel is established in virtual memory between the processes which allows for greatly simplified programming and simple expansion of resources as needed.

It should be understood that the elements shown in the figures may be implemented in various forms of hardware, software or combinations thereof Preferably, these elements are implemented in software on one or more appropriately programmed general-purpose digital computers having a processor and memory and input/output interfaces.

As will be appreciated by those skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Shared memory programming models are based on the concept that different tasks (typically threads) all have access to a shared virtual address space. In other words, if two tasks access a byte at virtual address X, they semantically access the same byte. Shared memory systems have significant advantages compared to message passing systems, including information inheritance, structure exchange, system load balancing, and memory footprint management. However, shared memory systems are also highly error-prone.

The synchronization of cache specific views, which is implied by the shared memory model, requires that all physical views involved in a shared memory computation know their mutual states to some degree. This creates a problem of inherently quadratic complexity. If one processor performs an operation and updates the view of its local cache, all processors may be required to know about it (known as cache line sharing). If N processors perform N simultaneous operations, $O(N^2)$ acquisitions of knowledge may have to occur before the operation can be completed.

The logic in current SMP capable processors concerned with cache coherence and the underlying communication protocols is complex and can cause serious scalability limitations. Furthermore, the implication on program performance through false cache misses or the saturation of communication bandwidth due to coherence traffic are implicit and machine dependent.

Developing software for shared memory systems or trying to parallelize an existing sequential program for a shared memory system faces difficulties having their root cause in the possibility of race conditions. In the mutex based programming model, race conditions can cause intermittent errors that are difficult to debug. It is the responsibility of the programmer to negotiate mutually exclusive ownership of data structures via mutices, barriers, semaphores and similar structures. In particular for existing sequential code it can be difficult to guarantee the non-existence of race conditions without severely hampering scalability due to contention at mutices. Furthermore, program errors due to lack of acquisition of the appropriate mutex can be very hard to analyze.

In a transactional memory model, race conditions can cause the excessive invalidation of speculative execution and thus severely limit parallelism. Since the symptom is only a performance impact, this appears to be even harder to debug than race conditions in mutex based multi-threading.

Shared memory systems impose implicit scalability limitations that are not directly transparent to the programmer. One of these implicit limitations is caused by coherence traffic and false cache misses, which may limit the potential gains in parallelization despite the fact that the problems are entirely communication and contention free according to the program semantics.

In contrast to shared memory programming models, common memory tasks do not share virtual address spaces. To the contrary, virtual address space can be managed as an explicit resource and this management is a key mechanism for task interactions. In a common memory programming model, information exchange between tasks is explicit and thus completely transparent to the programmer. There is no possibility for race conditions in the common memory model, and the key advantages of the shared memory model over message passing are maintained.

Figure 1:
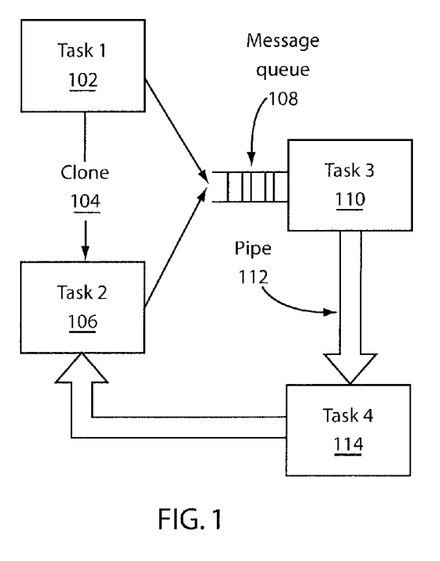
FIG. 1 shows a block diagram illustrating exemplary primitives in a common memory programming model.

Referring now to FIG. 1, a set of primitives for the common memory programming model are shown. Similar to Multi-Threading, the common memory programming model is based on a small set of primitives: Task, cloning, messenger, pipe, and channel. A task 102 executes a sequence of program instructions and has its own context and its own virtual address space. A task can be cloned 104, creating a copy of the original task. Initially the virtual address space of a newly cloned task references the same physical memory pages as the original task (a process referred to as "copy on write"). One possible implementation for a task is a Unix system process. In this case, fork performs the creation of a clone.

The message queue 108 is a facility that allows multiple tasks (102 and 106) to send small messages to a common receiving task 110. In other words, it performs an N:1 merge. The message queue ensures that messages are properly serialized, such that each message arrives once and with a delay of O(N) messages between the shortest possible spot in the message sequence relative to the sending point and the actual spot in the message sequence. Messages are small in size and used at a very low frequency compared to the execution of instructions. Thus, sending a message requires neither very high throughput nor very low latency.

A pipe 112 is a facility that allows the sending of larger quantities of serialized information from one task 110 to another 114. Pipes are not restricted to clone-parent communication. Data are encoded into a byte stream which is sent and received through an interface analogous to file I/O.

In accordance with the present principles, there is a primitive in the common memory model called a communication channel. A communication channel uses virtual address space (not mapped to memory) as an explicit resource. While higher single core performance, lower latency, and more physical memory are costly to obtain, virtual address space is a resource that is available in abundance and can be increased by many orders of magnitude with rather moderate hardware cost. Similar to a pipe, a communication channel 116 is a dedicated, unidirectional mechanism for communication between two tasks (114 and 106), but a communication channel allows to transfer pointer based structures without encoding or rebuilding.

An effective parallel programming model addresses several semantics. The creation of a new concurrent "worker" is accomplished by creating a new task. Cloning a parent task, as described above, is a powerful technique for creating a new task, as the new task inherits all of the information from the parent at virtually no cost, but it is not the only way. For the common memory model, it is sufficient that there is copy-on-write functionality between parent and child, such that the child does not need to inherit the parent's entire stack.

An effective programming model also provides for the exchange of information between two tasks. As described above, this can be accomplished through the use of pipes and communication channels. Pipes may play a supporting role for communication channels, as they are a possible medium for negotiating a communication channel or for transferring page table entries when resolving such a communication channel.

The effective programming model also includes a way to synchronize between tasks. In the case of the common memory model this is achieved via the messenger construct, which allows N tasks to send messages to exactly one task such that they are properly serialized. For example, resolving a communication channel could be triggered through a messenger primitive.

A communication channel from a task A to a task B is created by reserving an address space region $R_C$ which is not mapped to any physical memory in A or B. The receiving task B is not allowed to use the reserved address range. The sending task A creates the data structure it intends to send in this address range via a dedicated heap.

A 64-bit address provides over $10^{19}$ bytes of virtual address space. An address range with the size of the physically available memory is preferably reserved. This avoids an estimation the size of the communicated data structure. For example, for a machine with 1 TB of physical memory, a single task can participate in more than $10^7$ channels at once.

Figure 2:
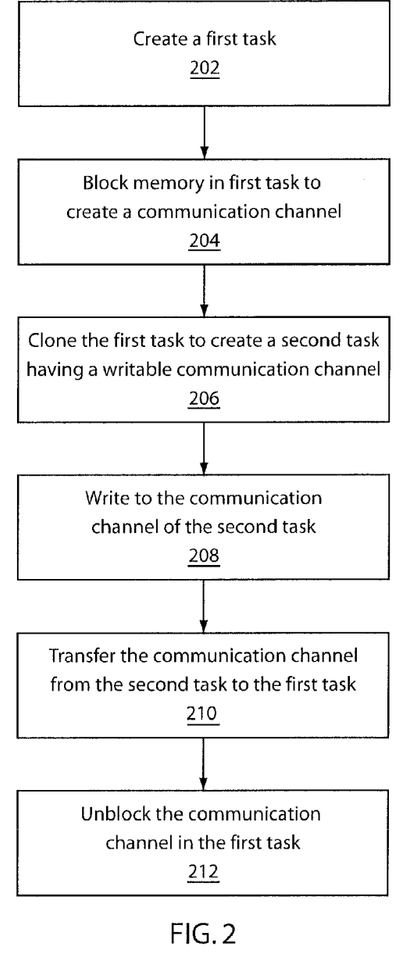
FIG. 2 shows a block/flow diagram of a technique for unidirectional communication between tasks.

Referring now to FIG. 2, a method/system for temporary, unidirectional communication between tasks is shown. A first task is created at block 202. A portion of that task's virtual memory is blocked in block 204. A second task is created at block 206, which may be a clone of the first task, having the same virtual address range reserved as the first task. The communication channel is initialized by giving the second task write access to the address range. Data is written to the second task's address range at block 208, and the data in the second task's address range is transferred to the first task's address range in block 210 by transferring the corresponding page table entries, thus using the communication channel. This includes integration of the physical memory mapped into the address range by the second task into the virtual address range of the first task and then unblocking the address range in the second task in block 212.

The problem of allocation and deallocation of communication channels is analogous to memory allocation (e.g. the malloc-subsystem in Unix systems). Each task has an address space heap in addition to its memory heap. Given the size of the resource space, resource use of a channel and the number of coexisting channels (which is typically tied to the number of cores), a 64-bit address space appears sufficient for shared-memory systems feasible for at least the near future, even in the presence of some fragmentation. Furthermore, there exist multiple options for the extension of address space by large factors, either through a wider address bus or segmentation schemes.

To communicate an entire data structure, task A removes the entries in its page table that map physical memory into the communication channel from its table and sends them to task B. The part of the reserved address range that was not mapped to physical memory is placed back into the address space heap of both A and B.

Task B integrates the received page table entries into its own page table. Additionally, it merges the dedicated memory heap that was established together with the data structure in the memory that was physically mapped into the communication channel by task B into its primary memory heap. Heap structures like "best fit malloc" allow efficient merging of heaps.

At the end of the transfer of the content of the communication channel, the transferred data structure, the mapped memory and eventually existing free blocks are part of task A as if they were created in task A. Referring now to FIGS. 3-6, an illustration of the communication channel primitive is shown.

Figure 3:
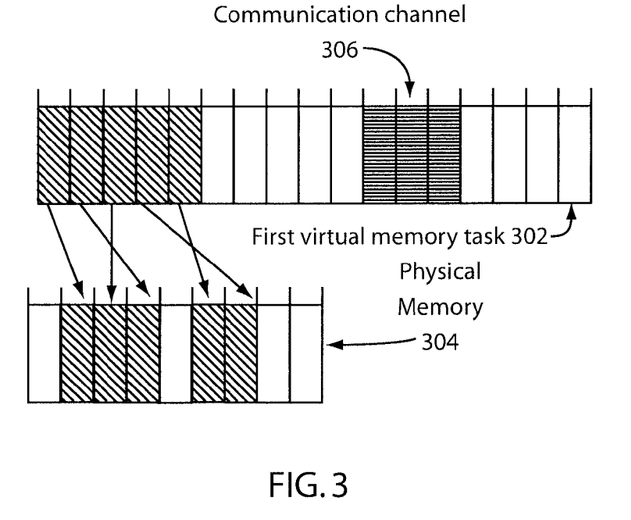
FIG. 3 shows a diagram of a first task having mappings to physical memory and a portion of virtual memory blocked off

Referring to FIG. 3, a first process/task is shown having a virtual memory 302 which covers seventeen pages, said virtual memory being mapped to nine pages of available physical memory. The striped pages are used by the processes, the uniformly shaded pages are declared as a communication channel 306 and thus blocked from usage by the first process. Each process/task has a table which associates pages in the virtual address space with pages in physical memory 304.

Figure 4:
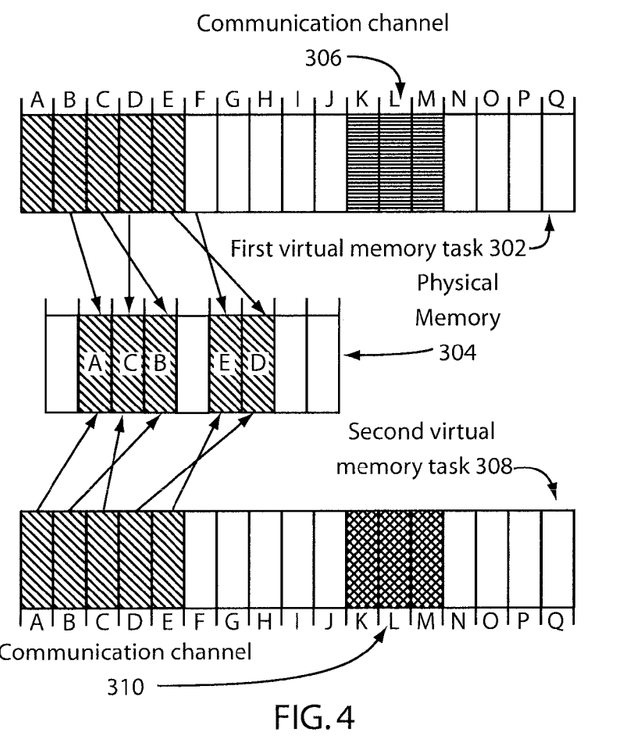
FIG. 4 shows a diagram of a second task that is a clone of the first task, with the portion of virtual memory corresponding to the first task's blocked portion being writable.

Referring now to FIG. 4, the situation after the creation of a clone is shown. The clone has a virtual page table 308 that is identical to the table 302 used by task 1, and thus the same mapping to physical memory 304. In other words, a read access to a location in task 2 will show the same content as a read access in task 1. However, the communication channel 310 is marked as writable in the clone, such that the clone can construct a result in that memory region.

Figure 5:
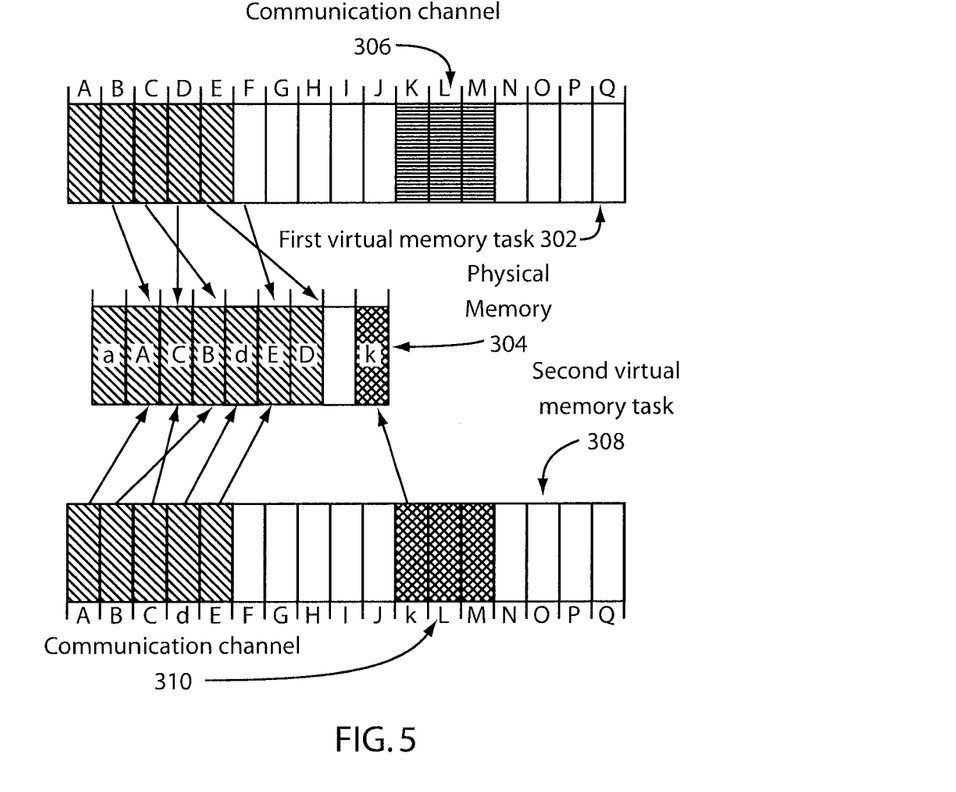
FIG. 5 shows a diagram of the second task having a portion of its communication channel mapped to physical memory.

Referring now to FIG. 5, task 2 has written to one of the pages of the communication channel 310, namely 'k'. The previously unmapped virtual address space in the communication channel 310 is now partially mapped to physical memory 304. The mapping is exclusively owned by task 2, since task 1 is prohibited to map memory to this virtual address range.

Figure 6:
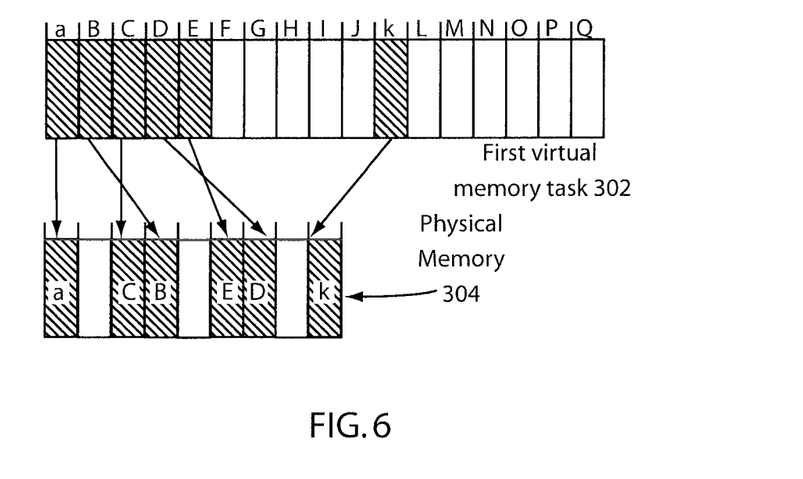
FIG. 6 shows the first task taking on the mapping corresponding to the second task's communication channel and having its own communication channel made writable.

Referring now to FIG. 6, the communication channel 310 has been relocated to task 1. The modified page k became part of the regular mapped virtual address space 302 of task 1 and the unmapped pages of the communication channel became available again. In task 2, page k became also a regular mapped page. When task 2 terminated, all physical memory pages which were held by it exclusively became available again. Thus, only the pages intended for exchange in the communication channel appear altered to task 1.

Figure 7:
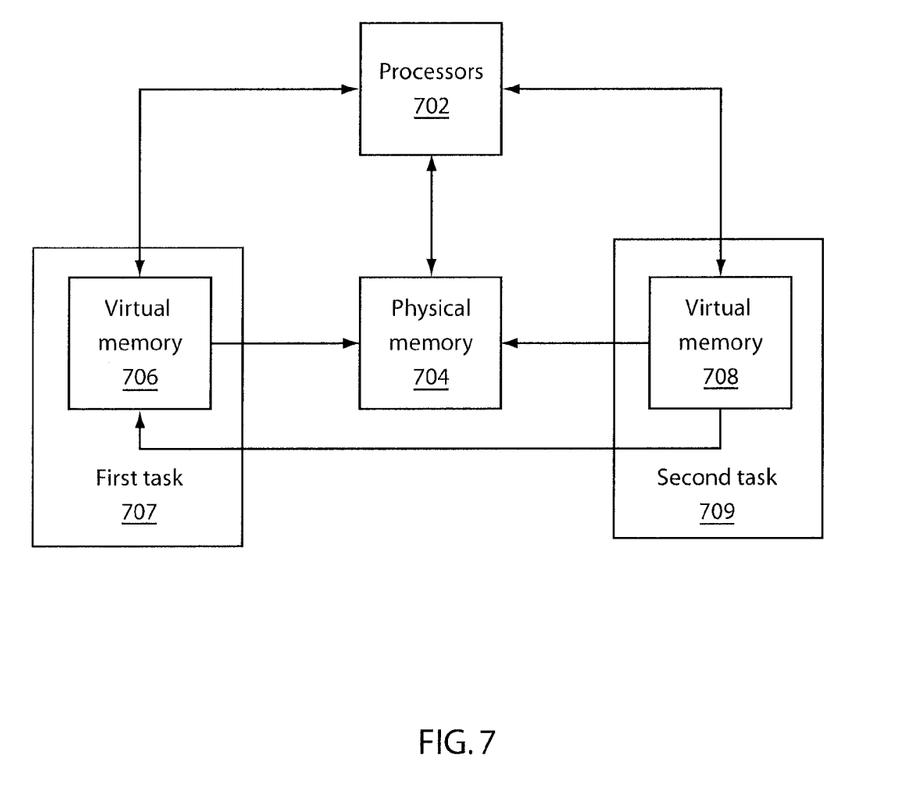
FIG. 7 shows a block/flow diagram illustrating a system incorporating a common memory model according to the present principles.

Referring now to FIG. 7, a block/flow diagram is shown illustrating a system that employs the common memory model. The common memory model differs from the shared memory model in several key ways. In shared memory threads, all virtual address space and all physical memory is shared at any given time. In contrast, common memory tasks never share physical memory 704 and only part of the virtual address space 706 and 708 is shared for a limited amount of time. This prevents the race conditions that inhere in shared memory systems. One or more processors 702 execute the tasks 707 and 709 and manage their virtual memories 706 and 708. Said virtual memories 706 and 708 map to physical memory 704.

In shared memory tasks, the association between memory and mutual exclusive ownership is implicit. In other words, which mutex is associated with which data structure depends on programmer consensus. In common memory tasks, the association between memory and mutual exclusive ownership is explicit and operates directly on memory ranges without requiring a construct like a mutex.

In addition, shared memory tasks implicitly communicate all of their information to every thread at all times. Communication between common memory tasks 707 and 709, however, is unidirectional and restricted to short periods of time.

One exemplary embodiment is the execution of N predefined tasks with P resources where the result is a single data structure. This may be considered as a simplification of a real very-large-scale integration (VLSI) design application. Consider an application that computes for a given graph G with N nodes and M weighted edges the shortest path trees rooted in all N nodes up to a diameter limit in a sequential program. Starting from each node n, a priority search is performed as a function. The function returns a pointer to a data structure that represents the tree, e.g. in form of a directed graph whose nodes and edges point to the corresponding nodes and edges in the original graph. Such a routine does not exist in isolation—the result may be used in further computations. The resulting trees are sorted or filtered based on a topological criterion.

The sequential program employs a function that uses a bit in the nodes of the input graph structure to keep track of the state of the nodes during the search. This example is sufficient to discuss the basic properties of the programming model and how they relate to parallelizing applications. For practical applications, it is helpful to take into account that there are sequential parts to load data that are often neglected in the theoretical discussion of parallelism. It is also advantageous that results are provided in a reusable form—simply computing them is not sufficient, they are preferably stored on a file system or gathered inside a single address space for further processing.

A strategy for parallelization is described below. There are N independent jobs, such as the tasks 707 and 709 in FIG. 7, which are distributed over P machines or threads or tasks for the message passing or shared memory or common memory programming model. For the purpose of this example, it can be assumed that each job has access to G. The cost of predicting which parts of G are actually accessed by a job is similar to the cost of performing the actual task, such that prediction is not practical. There are no dependencies between jobs and also the entire input is known up front. The compute cost may vary significantly between jobs. If a node is in a sparse region of the graph, the threshold diameter is reached quickly. If the node is in a dense region of the graph, a large part of G may be investigated. The result size varies significantly between jobs.

It is further assumed for the purposes of this example that the number N of jobs is much larger than the number P of compute resources available (e.g., processors 702). Since pre-partitioning into equal numbers of jobs often leads to very unsatisfying load balancing, a token based scheme is employed. P' resource tokens are created. Each job submission uses one token such that never more than P' jobs are actively computing. A token is returned after the result of a job is received.

Based on these constraints, the scheduling loop includes the following steps: Start jobs as long as tokens and unscheduled jobs are available; wait for a job to finish; receive result for finished job; and return to the beginning of the loop. Given a sufficiently large number of computing resources, this submission loop scheme will quickly reach an equilibrium state in which the number of actively computing jobs and the number of jobs waiting for their results to be processed depend on the rate at which the parent process can obtain and reintegrate the results.

In such an example, the message passing model and the shared memory model suffer substantial disadvantages. The message passing model imposes a high cost to receive, decode, and rebuild result structures in the master machine for further processing. The cost of building the tree then becomes a significant fraction of the complete cost, which is duplicated in a serial fashion and limits scalability according to Amdahl's law, which is known in the art. A shared memory scheme mitigates the scalability problems of message passing, but imposes a heavy burden in making the processes thread safe. In addition, lock contention on shared structures can impose a limitation on shared memory systems, as the time between lock release by one thread and its acquisition by a waiting thread can be significant. In particular, when parallelizing existing software, the amount of work used to avoid excessive locking can be comparable to the amount of work it would take to completely rewrite the code.

The common memory model preserves the advantages of the shared memory model while avoiding its most severe drawbacks. Each worker task inherits the data structure containing G and all other information from the parent process. The priority search code does not have to be modified— overloading of new/delete functions to redirect allocations to the address range of the communication channel is sufficient. Concurrent writing in the same virtual address position causes copy-on-write rather than a race condition.

In addition, each worker task, e.g. task 709, obtains its start node upon creation, as well as a communication channel in virtual memory. Each worker thread can independently build the resulting graph. The explicitly specified virtual memory areas 708 of the communication channels ensure that they are created at disjoint virtual memory locations. The serialization of the mechanism that maps virtual memory 708 to physical memory 704 ensures that they are constructed in disjoint physical memory regions.

Workers provide the master task, e.g. task 707, with the entry points through the communication channel or message queue mechanism. Relocation of the communication channels integrates the physical memory 704 of the result structures into the masters virtual address space 706. Terminations are collected via the message queue to serialize completion signals from workers.

In its essence, the solution in the common memory programming model is analogous to the multi-threaded solution. One difference is that only part of the virtual address space is exchanged and that no physical memory is actually shared (mapped at the same time by two different tasks). Mutually exclusive ownership is controlled on a larger granularity by controlling which task is allowed to map physical memory to the communication channels virtual address space.

The common memory model preserves some of the key advantages of the shared memory model, but since no virtual address space is shared at any time, no coherence between the individual views is necessary. The parts of the sending task's cache that hold lines of the affected virtual address range are only flushed when piece of a virtual table is transferred between tasks.

The primitives used in the common memory model relax requirements on the system architecture. They also reduce implicit scalability limitations such that the behavior of a program is more transparent to the programmer. One relaxation results from the fact that any interaction between virtual address spaces is explicit, bilateral and unidirectional. In the common memory model there is only one form of information exchange between different views which are created by different caches.

When a communication channel is relocated from a subtask A to a parent task B, A has to flush (e.g., write) the parts of its cache hierarchy which cover virtual addresses that are part of the communication channel. Since for the receiving task that virtual address region was not mapped and was blocked from use, it is insured that B does not contain cache lines which are invalidated. For an illustration of this, see FIG. 5.

Furthermore, one may write the local views only to the first shared level of cache. For example, if there is a shared L3-cache between the processors running tasks A and B at the time of communication, it is sufficient to transfer ownership of L3 cache lines. The problem of shared cache lines is eliminated, as well as the need for transmitting invalidations. The only way a cache line can become invalid is by modification by the processor/core which uses it. No piece of physical memory can be mapped to more than one cache line on the same level of cache hierarchy.

The only form of serialization (i.e. a potential race condition) that can occur in the message queue primitive is localized atomicity. Since a message queue is a strict N-to-one mapping, a tree logic which serializes concurrent signals into a sequence suffices. Again signal transmissions are relatively rare events, such that the latency of signal transmission is by far not as critical as the latency in the transmission of cache invalidations. Since a message queue merges information from multiple tasks, the number of concurrently used message queues is proportional to a fraction of the number of running tasks. A number of instances of a hardware signal merging logic proportional to the number of cores can cover the needs of applications with excellent concurrency in this mechanism. Furthermore, the context of sub-tasks can be restricted with little impact to the range of functionality, such that a sub-task only requires a single stack frame for the function call that is at the root of the submission similar to, e.g., threads.

Communication connections with the topology of a star or tree (e.g. multiple cores with individual caches connected to a joint cache in front of main memory, optionally with several cores having L1 caches clustered together through a joint L2 cache connecting to one joint L3 cache) satisfy all requirements of the common memory programming model well. Communication occurs in large amounts and is unidirectional. For N active tasks, at most N/2 processor-processor communications are used at any given point in time. Additionally, the communication functionality is semantically separated into disjoint types and separate from the memory access functionality. This allows the use of dedicated accelerators for the different functionalities.

If the memory mapping over virtual address space is round-robin distributed over multiple memory channels, parallelism in the main memory interface can be achieved which is proportional to the number of cores within the average well distributed accesses. It is ensured that no concurrent writes to the same page of physical memory will occur.

The above example was relatively easy to parallelize. However, common memory programming can also be applied to applications with irregular character, wherein there are complex data dependencies between tasks, individual subtasks vary in computing cost and memory use by several orders of magnitude, computing cost and result size for sub-tasks are hard to predict, and there is a large amount of communication compared to the amount of computing time. Such an application is hard to parallelize in several respects, in particular communication volume, load balancing, and data dependencies.

Figure 8:
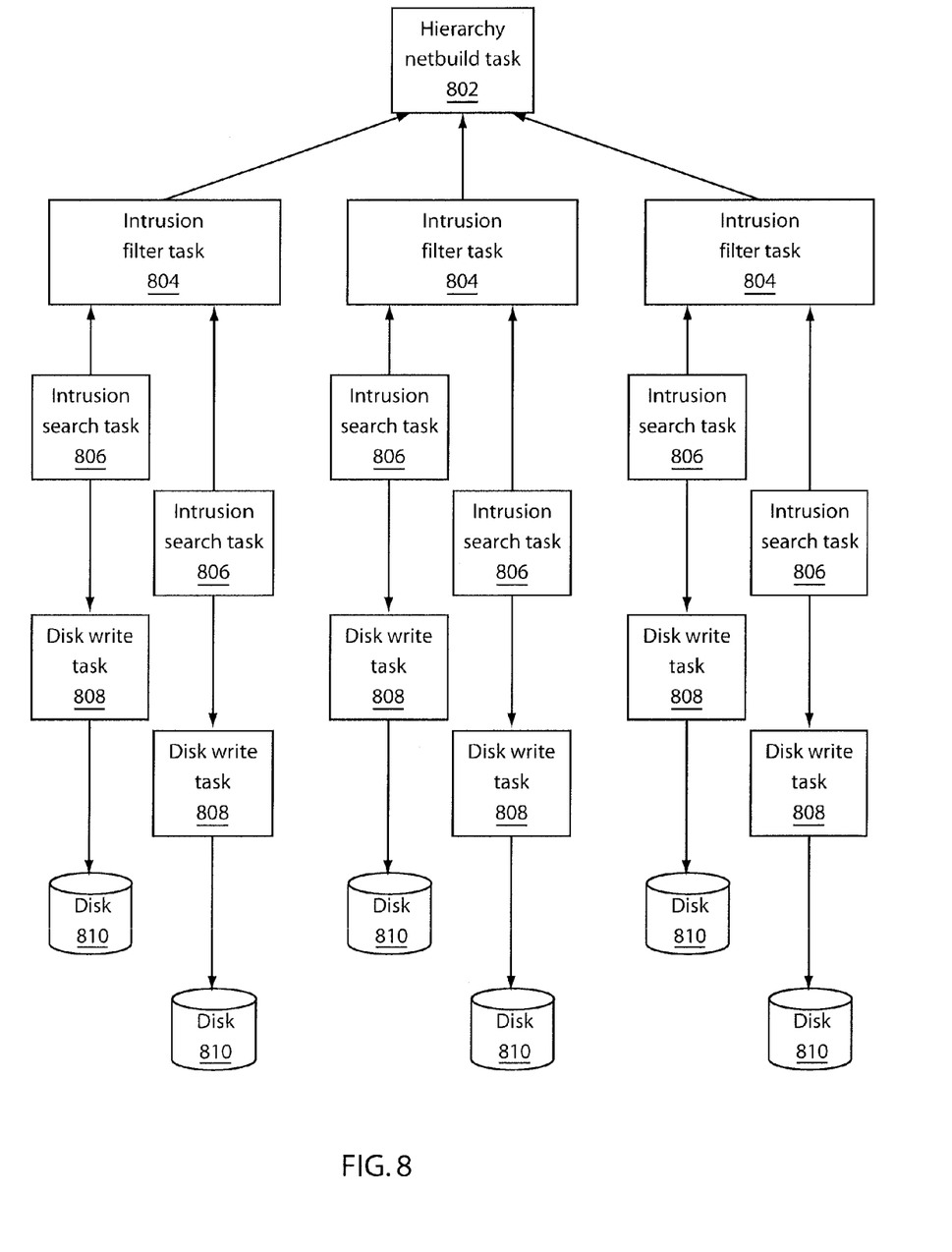
FIG. 8 shows a diagram of a parallel netlist extraction program using a common memory model.

Referring now to FIG. 8, one such application is shown. FIG. 4 shows a data flow and parallelization scheme used for netlist extraction in VLSI designs. The input to the application is a VLSI layout, with geometric shapes that describe the lithography masks for manufacturing a microprocessor. The application produces two outputs. The first output is the set of interactions of shapes on the lithography masks that cause electrical connectivity in the manufactured processor, called the 'intrusions.' The second output is a high level description of the connectivity in form of a netlist, identifying sets of shapes that form electrically connected components.

The application implementation in the common memory model was derived from a distributed approach which used the network file system for data exchange. The existing C++ classes could be reused without being changed by adding scheduling and communication wrappers.

The hierarchy netbuild task 802 shown in FIG. 8 is inherently sequential. It has unpredictable small write accesses with strong dependencies. It also needs its input, comprising filtered streams of intrusions, to be processed in a particular order defined by the directed acyclic graph which itself is defined by the VLSI design hierarchy. This task is persistent and it spawns and harvests hundreds of sub-tasks while adhering to a budget of tasks that may compute actively at any point in time. In FIG. 8 this budget is 3 processes at a time. The result of the hierarchy netbuild task is a complex graph reflecting the electrical connectivity of a semiconductor design such as a microprocessor.

Each intrusion filter task 804 reads streams of intrusions (data constructs of variable length) and accumulates a subset of the intrusions using a dictionary. For a concrete application run, an exemplary total data volume that could be absorbed is in the order of magnitude of 100 Gb, representing about 1 billion intrusions. Half of this data volume is passed on to the hierarchy netbuild task 802. These tasks 804 are created and immediately destructed as soon as they have delivered their results. The duration of individual tasks ranges from milliseconds to tens of minutes. Each such task 804 spawns multiple intrusion search subtasks 806 for itself.

Each intrusion search task 806 performs a geometric computation on a sub-hierarchy in the VLSI design, wherein a sub-graph in the directed acyclic graph of the design hierarchy is rooted in one or more nodes. The resulting intrusion set is sent to both the intrusion filters 804 and the disk writer tasks 808. These tasks are created and immediately destructed as soon as they have delivered their results. The duration of individual tasks again ranges from milliseconds to tens of minutes.

Each disk writer task 808 reads a stream of intrusions, encodes the intrusion streams into a byte stream, compresses the byte stream and writes the result into a file on disk 810. These tasks are persistent and their number correlates to the task budgets, so that at each point in time there is one compression task available for each actively computing intrusion search task 806. These tasks, or rather the communication channels to them, are handed to filter tasks 804 when they start and from there they are passed to intrusion search tasks 806 at the time of their start. When an intrusion search task 406 completes, the handle returns to its parent filter task 804 for redeployment. When a filter task 804 completes, the pipe to the persistent compression tasks 808 returns to the hierarchy netbuild task 802 for redeployment.

The exemplary application setup described above achieves an elapsed time that is within 20% of the theoretical lower bound imposed by a sequential execution time of the hierarchical netbuild task on a 16-way symmetric multiprocessor machine under the AIX® operating system, resulting in a speedup of more than a factor of 10 for the parallelized phase of the computation.

In a more practical comparison, the elapsed time for the entire phase was roughly as fast in the common memory model as the sequential hierarchical netbuild task by itself since reading the information from pipes was faster than reading the information from disk, compensating for parallelization overhead.

In one illustrative example, the design data loaded in core created a root process footprint of about 18 GB, which grows to about 30 GB while accumulating the net-list structure. Up to 80 processes were concurrently computing, but the total physical memory use remained within 70 GB thanks to 'copy-on-write.' As a comparison point, the sum of the address spaces which are simultaneously active over extended periods of time exceeded one TB, which indicates the effectiveness of copy-on-write in this scheme.

Having described preferred embodiments of a system and method for common memory programming (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for unidirectional communication between tasks, comprising:
    blocking a communication channel portion of a first virtual memory of a first task, such that the first task cannot access said portion;
    providing a second task, having access to a second amount of virtual memory with the same virtual address as the first virtual memory of the first task and having associated virtual table entries, wherein a communication channel portion of the second virtual memory corresponding to the blocked portion of the first virtual memory is usable;
    mapping virtual table entries in the communication channel to physical memory;
    transferring virtual table entries of the communication channel memory of the second task to the first task; and
    unblocking the communication channel memory of the first task responsive to said transfer of virtual table entries.

2. The method of claim 1, wherein the second task is provided by cloning the first task.

3. The method of claim 1, wherein the second task is provided by negotiating to find a common unmapped virtual memory region.

4. The method of claim 1, further comprising modifying the communication channel memory of the second task before transferring.

5. The method of claim 4, wherein said modification maps physical memory with data content into the virtual memory region of the communication channel.

6. The method of claim 1, further comprising the step of mapping an unblocked portion of the first task's virtual memory to physical memory.

7. The method of claim 6, wherein said step of providing a second task includes mapping an unblocked portion of the second task's virtual memory to physical memory.

8. The method of claim 7, further comprising the step of modifying a portion of physical memory corresponding to at least one of said mappings.

9. The method of claim 8, further comprising the steps of:
    terminating the second task; and
    releasing all physical memory which was mapped exclusively by the second task.

10. The method of claim 1, wherein unblocking includes establishing regular copy-on-write semantics for a mapped part of the communication channel.

11. A non-transitory computer readable storage medium comprising a computer readable program, wherein the computer readable program when executed on a computer causes the computer to perform the steps of:
    blocking a communication channel portion of a first virtual memory of a first task, such that the first task cannot access said portion;
    providing a second task, having access to a second amount of virtual memory with the same virtual address as the first virtual memory of the first task and having associated virtual table entries, wherein a communication channel portion of the second virtual memory corresponding to the blocked portion of the first virtual memory is usable;

mapping virtual table entries in the communication channel to physical memory;

transferring virtual table entries of the communication channel memory of the second task to the first task; and unblocking the communication channel memory of the first task responsive to said transfer of virtual table entries.

12. The computer readable storage medium of claim 10, wherein the second task is provided by cloning the first task.

13. The computer readable storage medium of claim 10, further comprising the step of modifying the communication channel memory of the second task before said step of transferring.

14. A system for parallel processing, comprising:
a physical memory;
a plurality of processes that are executed by one or more processors, including a first process and a second process, each process having a virtual memory that maps to the physical memory; and
a communication channel that establishes a temporary, unidirectional pathway for the transfer of pointer-based structures between the respective virtual memories of the first and second processes, wherein a writing process transfers virtual table entries of the communication channel to a receiving process and wherein the receiving process is blocked from accessing the communication channel until said virtual table entries are transferred.

15. The system of claim 14, wherein the communication channel does not maintain cache coherence.

16. The system of claim 14, wherein a portion of the virtual memory of the first task corresponding to the communication channel is not usable by the first task while the communication channel is active.

17. The system of claim 16, wherein said portion of virtual memory of the first task becomes usable by the first task after the communication channel closes.

18. The system of claim 14, wherein each process stores information that it alone references in physical memory that is not shared by any other process.

19. The system of claim 14, further comprising:
a message queue associated with one or more of said processes, the message queue accepting messages from one or more other processes; and
at least one pipe, allowing transfer of data between two processes.

20. The system of claim 14, wherein the second process is a clone of the first task.

* * * * *